July 17, 1962 R. J. DAVIES 3,044,760
SPRING ASSEMBLY
Filed March 2, 1959
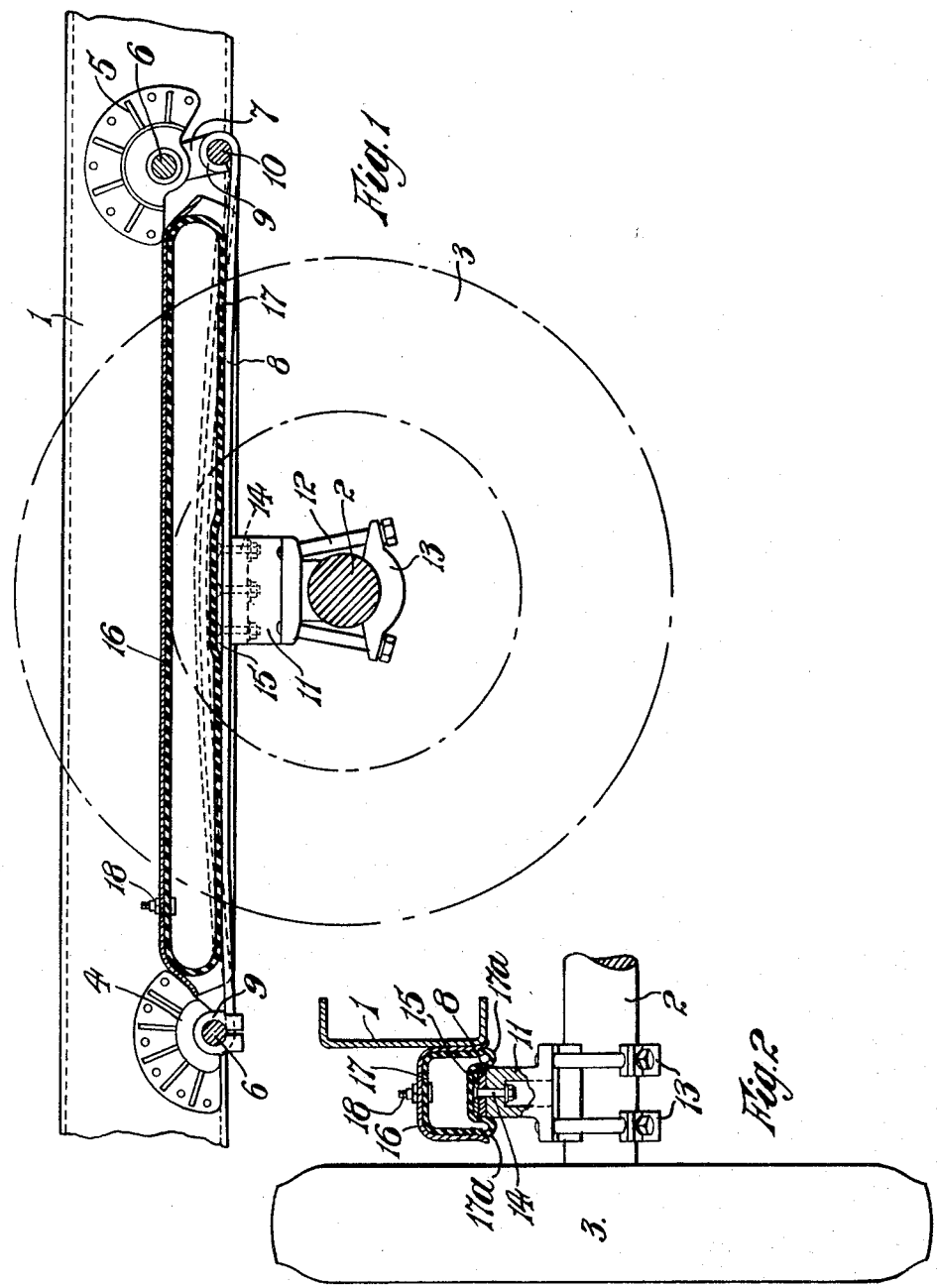
INVENTOR
Raymond John Davies
by Benj T. Rauber
his attorney

United States Patent Office 3,044,760
Patented July 17, 1962

3,044,760
SPRING ASSEMBLY
Raymond John Davies, Coventry, England, assignor to Dunlop Rubber Company Limited, London, England, a British company
Filed Mar. 2, 1959, Ser. No. 796,596
Claims priority, application Great Britain Mar. 15, 1958
6 Claims. (Cl. 267—31)

This invention relates to a spring assembly, and more particularly to a spring assembly for a vehicle suspension.

Fluid pressure springs for vehicles are known which comprise bellows assemblies, diaphragm and plunger assemblies or piston and cylinder assemblies. All such springs have hitherto possessed the common characteristic that unit relative movement between the ends of the springs, which are connected respectively to sprung and unsprung parts of the vehicle, has resulted in a relatively large change in volume of the pressure fluid within the spring. The rate of such springs is a function largely of the ratio of displaced volume to total volume so that, in order to provide an acceptably low spring rate, it has been necessary to make the total volume of the spring large, which is inconvenient when considered from other aspects.

The principal object of the present invention is to provide a fluid spring wherein this disadvantage is largely overcome.

According to the present invention a spring assembly for a vehicle comprises an elongated container for pressure fluid having a flexible wall and a plate-type spring arranged to arcuately deform said wall between its ends.

Preferably the container is associated with the sprung part of the vehicle, i.e. the chassis member, and the plate-type spring, which preferably comprises a blade or single-leaf spring, is shackled at its ends to the chassis member and is secured intermediate said ends to an associated wheel and axle assembly the arrangement being such that, as the vehicle is loaded, the spring deflects arcuately between its ends to deform the container.

The fluid spring may be designed to fit in existing vehicle layouts to replace existing large and heavy leaf-spring arrangements, i.e. it is long and of relatively small cross-section and preferably comprises a tubular flexible member positioned within a casing located longitudinally of the vehicle and directly above the blade or leaf spring. The bottom of the casing is open so that the central portion of the blade or leaf spring contacts the central portion of the tubular member and as the vehicle is loaded the spring deflects arcuately between its ends to arcuately deflect the tubular member, the greatest deflection taking place at the centre of the tubular member and the least deflection at its ends. Thus the displaced volume of the tubular member when under load may be considerably less than with conventional fluid springs of the same capacity with unit movement of the wheel and axle assembly.

In order that the invention may be better understood and carried into practice, reference will now be made to the accompanying drawings wherein:

FIGURE 1 is an elevation, partly in section, of a spring assembly fitted to a vehicle, only part of the latter being shown; and FIGURE 2 is an end elevation of the assembly and vehicle, again partly in section.

The vehicle shown in the drawings comprises a chassis member 1, an axle 2 and a wheel 3. Upon opposite sides of the axle, two brackets 4, 5 are secured to the member 1, each bracket including a pin 6 which extends parallel to the axle.

A hanger 7 is pivoted upon the pin of the shackle 5, and a single semi-elliptic leaf or blade spring 8 has opposite end portions formed into upstanding loops or eyes 9 which are pivoted to the pin of the bracket 4 and to a further pin 10 which is secured to the free end of the hanger.

A saddle 11 is seated upon the axle and secured thereto by bolts 12 engaging with clamps 13 which together embrace the axle. The saddle abuts the underside of the spring intermediate its ends and is secured to the spring by further bolts 14 which extend through holes in the spring and engage in a stiffener plate 15 located above and in abutment with the spring.

Associated with and secured to the chassis member is a casing 16 of channel section: the mouth of the channel is located adjacent the spring and the side-walls of the channel extend (in the position shown in the drawings) beyond the respective longitudinal edges of the spring. At opposite ends the base of the channel is inclined towards the spring, and the said ends are disposed as near as possible, to the respective brackets. The free ends of the said side-walls and inclined ends are flared outwardly.

Located in the casing is a resilient flexible container 17 made of rubber reinforced with nylon cord. The container is of circular cross-section throughout its length prior to assembly within the casing, and is substantially equal in length to the casing, so that its ends are disposed near to the respective eyes 9.

As shown in the drawing, the container accommodates itself to the shape of the casing when assembled therein and inflated with pressure fluid through the connection 18 so that it abuts the spring and the casing base and side-walls, and assumes a substantially rectangular section with two lobes 17a projecting between the respective longitudinal edges of the spring 8 and the casing 16.

Application of load to the vehicle causing the axle and the chassis member to move towards one another, deflects the spring 8 so that it extends arcuately upwards from its undeflected position shown in full lines in FIGURE 1 to a deflected position shown in dotted lines. The deflection is at a maximum adjacent the axle, i.e., intermediate the ends of the springs, and at a minimum adjacent the ends of the spring. Because the container abuts the casing and the spring along its entire length, the container will be deflected in a similar manner, also shown in dotted lines, to that in which the spring is deflected, and will become plano-concave when viewed in sectional elevation: hence the maximum deflection of the spring will be at the points adjacent the axle and the ends of the container will be substantially undeflected.

It will be seen that the change in volume of the container for unit relative deflection of the spring is relatively small, thereby enabling an acceptably low spring rate to be achieved with a container of relatively small volume.

Furthermore, the combination of the semi-elliptic leaf or blade spring with the container enables the advantages of a fluid spring to be realised without the necessity of providing radius rods and the like to locate the axle, because the latter is located by the leaf spring.

The spring assembly above described occupies substantially the same space as a conventional multi-leaf semi-elliptic spring and may be fitted in place of the said multi-leaf spring in an existing vehicle.

The casing may conveniently form part of an existing chassis-member of the vehicle. Alternatively the casing and tubular container may comprise a composite unit having rigid side-walls and base and one wall, abutting the leaf or blade spring, comprising a flexible member fluid-tight secured to said side-walls.

Preferably, as illustrated in the drawings, the two ends of the elongated container are located as close as possible to the plate spring shackle bushes where the vertical movements are at a minimum and the eyes of the spring are preferably above the plane of the blade when it is in an undeflected position.

Having now described my invention, what I claim is:

1. A spring assembly for a vehicle which comprises a rigid channel-shaped casing having a pair of parallel, spaced, flanges and a web connecting said flanges and having means for attachment to the sprung part of the vehicle, an inflatable pneumatic container in said channel fitting against said web and flanges of said channel to fill said channel when inflated and extending substantially to the end of said channel, said container having flexible walls, and a leaf spring extending the length of said channel at its open side in contact with said pneumatic container and having means at its ends for connection to the sprung part of the vehicle, said spring being of less width than the space between said flanges to form the wall of said pneumatic container into rolling lobes between said spring and said flanges when said spring is deflected into said channel between its ends.

2. The spring assembly of claim 1 in which said web is straight.

3. The spring assembly of claim 1 in which said spring is flat when not deflected.

4. The spring of claim 1 comprising a support for an axle secured to said spring intermediate its ends.

5. The spring assembly of claim 1 in which said means for attachment to the sprung part of the vehicle comprises a hanger pivoted on one end of said spring.

6. The spring assembly of claim 5 comprising a vehicle chassis member above said spring to which said means are attached and in which said hanger extends vertically upwardly from the plane of the spring when undeflected and is attached at its upper end to said chassis.

References Cited in the file of this patent

UNITED STATES PATENTS

| | | |
|---|---|---|
| 1,077,472 | Hofmann | Nov. 4, 1913 |
| 1,083,737 | Goschke | Jan. 6, 1914 |
| 1,120,511 | Mayer | Dec. 8, 1914 |
| 1,273,813 | Bernat | July 30, 1918 |
| 1,792,876 | Stout | Feb. 17, 1931 |
| 1,991,184 | Towner | Feb. 12, 1935 |
| 2,606,757 | Cairns | Aug. 12, 1952 |

FOREIGN PATENTS

| | | |
|---|---|---|
| 403,497 | France | Sept. 24, 1909 |